(12) United States Patent
Tosa

(10) Patent No.: US 8,856,059 B2
(45) Date of Patent: Oct. 7, 2014

(54) INFERENCE DEVICE AND INFERENCE METHOD

(71) Applicant: The Bank of Tokyo—Mitsubishi UFJ, Ltd., Tokyo (JP)

(72) Inventor: Teppei Tosa, Tokyo (JP)

(73) Assignee: The Bank of Tokyo—Mitsubishi UFJ, Ltd., Tokyo (JP)

( * ) Notice: Subject to any disclaimer, the term of this patent is extended or adjusted under 35 U.S.C. 154(b) by 211 days.

(21) Appl. No.: 13/664,592

(22) Filed: Oct. 31, 2012

(65) Prior Publication Data

US 2013/0110759 A1 May 2, 2013

(30) Foreign Application Priority Data

Nov. 1, 2011 (JP) ................. 2011-240208

(51) Int. Cl.
*G06N 5/04* (2006.01)
(52) U.S. Cl.
CPC . *G06N 5/04* (2013.01); *G06N 5/045* (2013.01)
USPC .............................................. 706/47; 706/45
(58) Field of Classification Search
None
See application file for complete search history.

(56) References Cited

U.S. PATENT DOCUMENTS 5,179,632 A 1/1993 Masui et al.

FOREIGN PATENT DOCUMENTS

| EP | 0318983 | A2 | 6/1989 |
|---|---|---|---|
| EP | 1 811 520 | A2 | 7/2007 |
| JP | S63036359 | A | 2/1988 |
| JP | H01147629 | A | 6/1989 |
| JP | H01161441 | A | 6/1989 |
| JP | H02079123 | A | 3/1990 |
| JP | H03116330 | A | 5/1991 |
| JP | H03286228 | A | 12/1991 |
| JP | 5-346855 | A | 12/1993 |
| JP | 6-44074 | A | 2/1994 |
| JP | H07219777 | A | 8/1995 |
| JP | 2007-193457 | A | 8/2007 |
| JP | 2007-257285 | A | 10/2007 |

OTHER PUBLICATIONS

Irmer, Bridging Inferences in Discourse Interpretation, Doctoral Thesis, University of Leipzig, Nov. 2009, pp. 1-287.*
Office Action of JP2011-240208, counterpart application of this application, issued by Japan Patent Office dated Jun. 25, 2013.

* cited by examiner

*Primary Examiner* — Wilbert L Starks
(74) *Attorney, Agent, or Firm* — Novak Druce Connolly Bove + Quigg LLP

(57) ABSTRACT

An inference device is disclosed including a rule base including a graph data structure corresponding to a table formed from columns, each column corresponding to a symbol, and one or more rows including cells, each cell arranged in a position of a column and storing a value for forming a logical expression by applying to each symbol corresponding to a column where the cell is located, the graph data structure including a root node and sequences of nodes connected in series, each sequence of nodes corresponding to a row and each node corresponding to a cell. An end-node of each sequence nodes is connected to the root node, the nodes can be scanned in order following pointers from the root node, each row represents a rule in which logical expressions are arranged on the left side as a logical conjunction and logical expressions are arranged on the right side.

14 Claims, 14 Drawing Sheets

FIG. 2

$$A_1(a_{11}) \wedge A_2(a_{12}) \wedge \cdots \wedge A_n(a_{1n}) \supset B\ (b_1)$$

$$A_1(a_{21}) \wedge A_2(a_{22}) \wedge \cdots \wedge A_n(a_{2n}) \supset B\ (b_2)$$

$$\cdots$$

$$A_1(a_{m1}) \wedge A_2(a_{m2}) \wedge \cdots \wedge A_n(a_{mn}) \supset B\ (b_m)$$

FIG. 3

| $A_1$ | $A_2$ | ... | $A_n$ | B |
|---|---|---|---|---|
| $a_{11}$ | $a_{12}$ | ... | $a_{1n}$ | $b_1$ |
| $a_{21}$ | $a_{22}$ | ... | $a_{2n}$ | b |
| ⋮ | ⋮ | ⋮ | ⋮ | ⋮ |
| $a_{m1}$ | $a_{m2}$ | ... | $a_{mn}$ | $b_m$ |

FIG. 4

| request for approval type | post | amount of money | request for approval necessity |
|---|---|---|---|
| item purchase | assisstant | * | necessay |
| item purchase | manager | less than 1000 dollars | unnecessary |
| item purchase | manager | more than 1000 dollars | necessay |
| business trip | assisstant | less than 1000 dollars | unnecessary |
| business trip | assisstant | more than 100 dollars | necessay |
| business trip | manager | less than 500 dollars | unnecessary |
| business trip | manager | more than 500 dollars | necessay |
| general | assisstant | * | necessay |
| general | manager | less than 700 dollars | unnecessary |
| general | manager | more than 700 dollars | necessay |

| route (root) node | | |
|---|---|---|
| | + | $A_1(a_{11}), A_1(a_{21}), \cdots, A_1(a_{m1})$ |
| | − | $B_1(b_{11}), B_2(b_{21}), \cdots, B_n(b_{m1})$ |

(b)

| route (root) node | | |
|---|---|---|
| | + | $A_{i+1}(a_{jk+1})$ |
| | − | $A_{i-1}(a_{jk-1})$ |

FIG. 10

| request for approval type | post | amount of money | request for approval necessity |
|---|---|---|---|
| item purchase | assisstant | * | necessay |
| | manager | less than 1000 dollars | unnecessary |
| | | more than 1000 dollars | necessay |
| business trip | assisstant | less than 100 dollars | unnecessary |
| | | more than 100 dollars | necessay |
| | manager | less than 500 dollars | unnecessary |
| | | more than 500 dollars | necessay |
| general | assisstant | * | necessay |
| | manager | less than 700 dollars | unnecessary |
| | | more than 700 dollars | necessay |

FIG. 12

| post | request for approval type | amount of money | request for approval necessity |
|---|---|---|---|
| assisstant | item purchase | * | necessay |
| | business trip | less than 100 dollars | unnecessary |
| | | more than 100 dollars | necessay |
| | general | * | necessay |
| manager | item purchase | less than 1000 dollars | unnecessary |
| | | more than 1000 dollars | necessay |
| | business trip | less than 500 dollars | unnecessary |
| | | more than 500 dollars | necessay |
| | general | less than 700 dollars | unnecessary |
| | | more than 700 dollars | necessay |

INFERENCE DEVICE AND INFERENCE METHOD

CROSS REFERENCE TO RELATED APPLICATION

This application is based upon and claims the benefit of priority from the prior Japanese Patent Application No. 2011-240208, filed on Nov. 1, 2011; the entire contents of which are incorporated herein by reference.

FIELD

The present invention is related to an inference device and an inference method. In particular, the present invention is related to an inference device and an inference method which is configured to perform both forward inference for obtaining a conclusion of a judgment and backward inference for obtaining an expected conclusion by expressing inference rules based on a graph data structure.

BACKGROUND

A computer system is used in administration processing in business such as banking. In administration processing administrative rules such as which processes are to be performed next under what type of conditions are determined. Conventionally, when building a computer system used in administration processing these administrative rules are included within the logic of a program which operates on the computer system. Consequently, it is necessary to revise the entire program each time the administration rules change.

Thus, the administration rules are separated from the logic of the program. That is, administration rules are written as rules using a formal language, stored in a rule base, inference is performed in an inference device (for example, see Japanese Laid Open Patent H5-346855) such as a rule engine, data required for the inference is input to the rule engine from a program and the conclusion of the inference is returned to the program from the rule engine.

Other examples related to the background of the present invention are disclosed in Japanese Laid Open Patent H6-44074, Japanese Laid Open Patent 2007-257285, Japanese Laid Open Patent 2007-193457, etc.

SUMMARY

Rules stored in a rule base in a conventional rule engine are expressed as a tree structure. As a result, inference in a direction from the root to a leaf of a tree structure can be performed at high speed. However, inference in a reverse direction cannot be performed and even in the case where reverse inference can be performed efficiency decreases.

Thus, an inference device is disclosed which can both lead to a conclusion from given/provided conditions and obtain conditions for obtaining an expected conclusion.

As one embodiment of the present invention, an inference device including a rule base, a data for acquisition part, and an inference part is provided. The rule base includes a graph data structure. The graph data structure corresponds to a table. The table is formed from a plurality of columns arranged in a certain order, each of the plurality of columns corresponding to a predicate symbol, and one or more rows including a plurality of cells, each of the plurality of cells arranged in a position of one of the plurality of columns, each of the plurality of cells in the table storing a value for forming a logical expression by applying to each predicate symbol corresponding to a column where the cell is located, the graph data structure including a root node and a plurality of sequences of nodes, nodes in each of the plurality of sequences being connected in series by pointers in an order of the columns, each of the plurality of sequences of nodes corresponding to a row of the table and each node corresponding to a cell in a row of the table, a node at an end of each of the plurality of sequences of nodes is connected to the root node by a pointer, the plurality of node being configured to be scanned in order following the pointers from the root node, each row of the table representing a rule in which a plurality of logical expressions are arranged on the left hand side as a logical conjunction and a logical expression are arranged on the right hand side. The data for acquisition part obtains data for judging whether a logical expression is true or false, the data being input to a plurality of input areas. The inference part scans nodes which represents a plurality of logical expressions of a logical conjunction arranged on the left side of a rule when a logical expression on the right hand side of a rule is judged to be true using the data obtained by the data acquisition part and calculates a logical expression which should be judged to be true for establishing the rule, where the logical expression judged to be true is arranged on the right hand side. The inference part scans nodes connected in series and calculates a logical expression which is true among the logical expressions arranged on the right hand side of any one of the plurality of rules is calculated when logical expressions on the right hand sides of all of the rules are judged to be indefinite using the data obtained by the data acquisition part.

In addition, as one embodiment of the present invention an inference method is provided. The method is executed by a computer referring to a rule base. The rule base includes a graph data structure corresponding to a table formed from a plurality of columns arranged in a certain order, each of the plurality of columns corresponding to a predicate symbol, and one or more rows including a plurality of cells, each of the plurality of cells arranged in a position of one of the plurality of columns, each of the plurality of cells in the table storing a value for forming a logical expression by applying to each predicate symbol corresponding to a column where the cell is located, the graph data structure including a root node and a plurality of sequence of nodes, nodes in each of the sequences being connected in series by pointers in a sequence order of the columns, each of the plurality of sequences of nodes corresponding to a row of the table and each node corresponding to a cell in a row of the table, a node at an end of each of the plurality of sequences of nodes is connected to the root node by a pointer, the plurality of node being configured to be scanned in order following the pointers from the root node, each row of the table representing a rule in which a plurality of logical expressions are arranged on the left hand side as a logical conjunction and a logical expression is arranged on the right hand side. The inference method includes: obtaining data for judging whether a logical expression is true or false and storing the data in a memory, the data being input to a plurality of input areas; scanning a node which represents a plurality of logical expressions of a logical conjunction arranged on the left hand side of a rule when a logical expression on the right hand side of a rule is judged to be true using the data obtained by a data acquisition part and calculating a logical expression which should be judged to be true for establishing the rule in which the logical expression judged to be true is arranged on the right hand side; and scanning nodes connected in series and calculating a logical expression which is true among the logical expressions arranged on the left hand side of any one of the plurality of rules is calculated when a logical expression on the right side of all of the rules is judged to be indefinite using the data obtained by the data acquisition part using the data obtained by the data acquisition part.

In addition, as one embodiment of the present invention an inference method is provided. The inference method is executed by a computer referring to a rule base storing a plurality of rules in which a plurality of logical expressions are arranged on the left hand side as a logical conjunction and a logical expressions is arranged on the right hand side using a graph data structure in which nodes representing a logical expression arranged in a sequence corresponding to a rule are connected in series and a node on an end of each sequence are connected to a root node with respect to each rule. The inference method includes: obtaining data for judging whether the logical expression is true or false and storing the data in a memory, the data being input to a plurality of input areas; scanning a node which represents a plurality of logical expressions of a logical conjunction arranged on the left hand side of a rule in which the logical expression judged to be true is arranged on the right hand side when a logical expression on the right hand side of a rule is judged to be true using the data obtained by a data acquisition part and calculating a logical expression which should be judged to be true for establishing the rule in which the logical expression judged to be true is arranged on the right hand side; and scanning nodes connected in series and calculating a logical expression which is true among the logical expressions arranged on the left hand side of any one of the plurality of rules is calculated when logical expressions on the right hand side of all of the rules are judged to be indefinite using the data obtained by the data acquisition part using the data obtained by the data acquisition part.

In addition, as one embodiment of the present invention an inference method is provided. The inference method is executed by a computer referring to a rule base storing a plurality of rules in which a plurality of logical expressions are arranged on the left hand side as a logical conjunction and a logical expressions is arranged on the right hand side using a graph data structure in which nodes representing a logical expression arranged in a sequence corresponding to a rule are connected in series and a node on an end of each sequence are connected to a root node with respect to each rule. The method includes obtaining data for judging whether the logical expression is true or false and storing the data in a memory, the data being input to a plurality of input areas; scanning a node which represents a plurality of logical expressions of a logical conjunction arranged on the left hand side of a rule in which the logical expression judged to be true is arranged on the right hand side when a logical expression on the right hand side of a rule is judged to be true using the data obtained by a data acquisition part and calculating a logical expression which should be judged to be true for establishing the rule in which the logical expression judged to be true is arranged on the right hand side; and scanning nodes connected in series and calculating a logical expression which is true among the logical expressions arranged on the left hand side of any one of the plurality of rules is calculated when logical expressions on the right hand side of all of the rules are judged to be indefinite using the data obtained by the data acquisition part using the data obtained by the data acquisition part In addition, as one embodiment of the present invention a rule base is provided. The rule base includes a graph data structure corresponding to a table formed containing a plurality of columns, each column corresponding to a predicate symbol, being arranged in a certain sequence, and a plurality of rows including cells, each of cells being arranged in a position of any one of the plurality of columns, the table storing a value for forming a logical expression by applying to each predicate symbol corresponding to a column where the cell is located. The rule base includes a root node stored in a memory space; and sequences of a plurality of nodes stored in the memory space, each of the plurality of nodes corresponding to a cell in each row of the table, the plurality of nodes being connected in series using pointers in an order of the columns in the memory space; wherein a node at an end of each sequence of the plurality of nodes is connected to the root node by pointers, nodes in each sequence being configured to be scanned in order following the pointer from the root node.

BRIEF DESCRIPTION OF DRAWINGS

FIG. 2 is an example diagram of a rule in one embodiment of the present invention, FIG. 3 is an example diagram of a table for interpreting rules in one embodiment of the present invention, FIG. 4 is an example diagram of a specific table for interpreting rules in one embodiment of the present invention, FIG. 6 is an exemplary diagram of a structure of data stored in a rule base of an inference device related to one embodiment of the present invention, FIG. 10 is an example diagram of a table for interpreting rules in one embodiment of the present invention, FIG. 12 is an example diagram of a table for interpreting rules in one embodiment of the present invention.

DESCRIPTION OF EMBODIMENTS

The embodiments for realizing the present invention are explained below. Furthermore, the present invention is not limited to the embodiments explained below and various modifications of the present invention can be carried out.

(An Example of Configuration of an Inference System)

Figure 1:
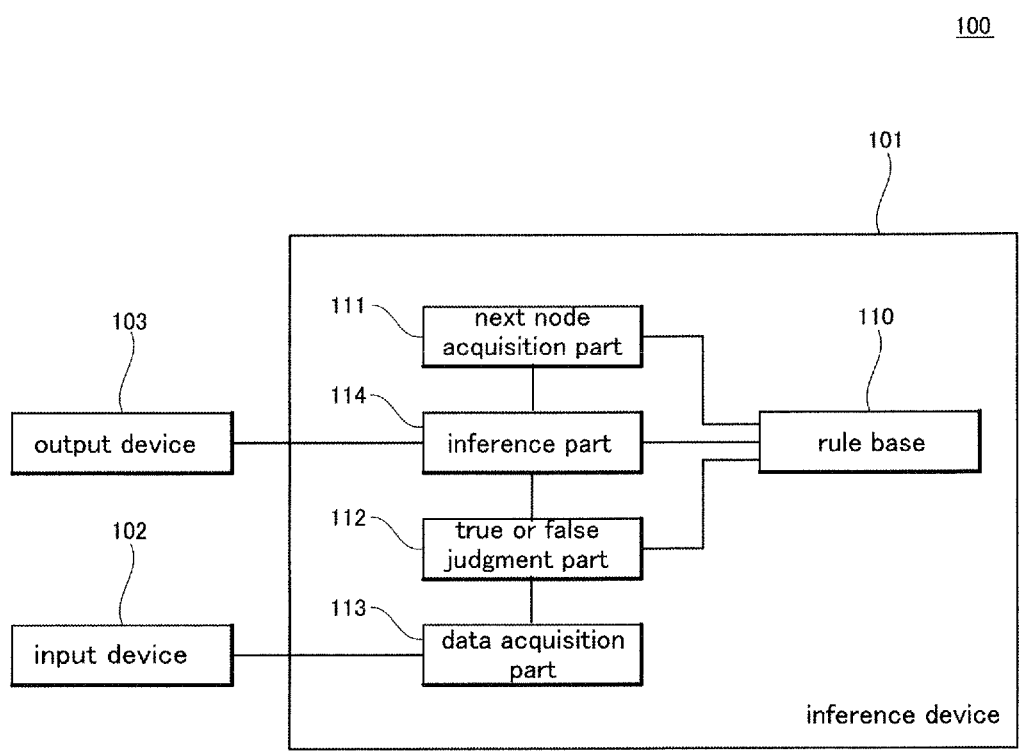
FIG. 1 is a functional block diagram of a system which includes an inference device related to one embodiment of the present invention.

FIG. 1 shows a functional block diagram of an inference system related to one embodiment of the present invention. An inference system 100 is arranged with an inference device 101, an input device 102, and an output device 103. The input device 102 inputs data generated as the result of an operation by a user or as the result of an operation of another device is input to the inference device 101 and the output device 103 receives inference results from the inference device 101 and outputs the results on a display, etc.

The following is an example of this type of inference system. A form for performing an electronic application is displayed on the display of the input device 102, a user inputs date to the form and the result of the input is sent to the inference device 101. The inference device 101 infers whether the data input to the form is correct or not, sends a result of this inference to the output device 103, and the output device 103 displays the result of the inference.

Furthermore, in an embodiment of the present invention, it is not necessary for the input device 102 and the output device 103 to be separate devices, the same device may include both the functions of the input device 102 and the output device 103. For example, a part of a window displayed on the display of the input device 102 may correspond to the output device 103.

In addition, as examples of electronic applications, applications such as income tax electronic application, patent applications using the internet and electronic submission of university courses may be included.

In particular, the inference device 101 of the inference system related to the present embodiment can also perform backwards inference as is explained herein. Consequently, for example, when submitting university courses, courses already taken by a student and unit number data can be input to the inference device 101 from the input device 102, the inference device 101, which includes a rule base which stores rules for expressing the requirements for graduating the university, can infer which subjects should be taken in order to satisfy the requirements for graduating the university and the result can be output to the output device 103.

In addition, requests from customers are often presented at counter services at banks. For example, requests such as reissue of a lost deposit account book or change of a registered seal are presented. The inference device 101, which includes a rule base for storing bank rules may be able to give an answer to a request of a customer, receives information such as identification documents which can be readily presented by a customer and customer's dealings with the bank from the input device 102, or in the case where the bank cannot satisfy the request, the inference device 101 can infer what should be performed in order to satisfy the customer's request and output it to the output device 103.

In addition, a work flow system which distributes electronic application forms according to rules may be formed using the input device 102 and the output device 103. In order to determine the distribution location or destination of an application form, details contained in the application form may be sent to the inference device 101 from the work flow system, and data such as the distribution location or destination obtained from a result of an inference by the inference device 101 which stores work flow rules may be sent to the work flow system.

With this type of structure, it is possible to separate rules from the logic of a program process and even if the rules change, while the storage details of the rule base in the inference device also change, it is possible to prevent changes such as revision from affecting the entire system.

The structure of the inference device 101 is explained below. The inference device 101 includes a rule base 110, a next node acquisition part 111, a true-false judgment part 112, a data acquisition part 113 and an inference part 114.

The rule base 110 stores data structures which represent one or a plurality of rules. The rule base 110 includes a storage device and a data structure is stored in the data device. A rule is expressed by a production rule format such as $[F_1 \hat{} F_2 \hat{} \ldots \hat{} F_n \supset G]$. That is, a rule is used in which a logical expression of one or a plurality of logical expressions $[F_1], [F_2], \ldots, [F_n]$ combined by $[\hat{}]$ are arranged on the left hand side of $[\supset]$ and a logical expression $[G]$ is arranged on the right hand side of $[\supset]$. This type of rule means that if all of the logical expressions $[F_1], [F_2], \ldots, [F_n]$ arranged on the left hand side of $[\supset]$ are true, the logical expression $[G]$ arranged on the right hand side of $[\supset]$ is true. In addition, viewed from a different aspect, this means that for the logical expression $[G]$ arranged on the right hand side of $[\supset]$ to be true it is necessary that all of the logical expressions $[F_1], [F_2], \ldots, [F_n]$ arranged on the left hand side of $[\supset]$ to be true.

A logical expression may also be an atomic equation. For example, an equal atomic equation where the value of a variable x such as [x=v] expresses the value of [x] equals to a constant v, or an unequal atomic equation such as [x≤v] or [x≥v]. In addition, the logical expression may also be a format such as in [Have (passport)] including a constant [passport], which represents [someone has a passport]. This expression includes [Have], a predicate symbol with [passport], a constant value. In an equal equation such as [x=v] or an unequal equation such as [x≤v] or [x≥v], while [=], [≤] or [≥] can generally be considered predicate symbols. In the present embodiment a variable name is sometimes considered as a predicate symbol in an equal equation or unequal equation which includes a variable. That is, [x(v)] may be used instated of [x≤v], etc.

In addition, in the case where there are a plurality of rules in which the left hand side of $[\supset]$ is the same as in $[A \supset B]$ and $[A \supset C]$ but the right hand side is different, the rule may be a logical expression in which the left hand side of $[\supset]$ is combined with $[A]$ as in $[A \supset B \hat{} C]$.

FIG. 2 shows an example of m rules, that is, the number of rules shown in FIG. 2 is m. In FIG. 2, $[A_1], [A_2] \ldots, [A_n], [B]$ represent predicate symbols and $[a_{11}], [a_{12}], \ldots, [a_{1n}], [a_{21}], [a_{22}], \ldots, [a_{2n}], [a_{m1}], [a_{m2}], \ldots, [a_{mn}], [b_1], [b_2], \ldots, [b_m]$ represent variables applied to predicate symbols. A logical expression is formed by applying variables to predicate symbols. Here, a variable expressed by $[a_{11}]$, for example, is not limited to a scalar value formed from an individual value and may be formed from multiple values, for example, a vector value. In addition, the same variable may appear multiple times within $[a_{11}], [a_{12}], \ldots, [a_{1n}], [a_{21}], [a_{22}], \ldots, [a_{2n}], [a_{m1}], [a_{m2}], \ldots, [a'''], [b^1], [b^2], \ldots, [b'''].$ Furthermore, more generally, the order of the predicate symbols arranged on the left hand side of $[\supset]$ may be different for each rule. In this way, in the case where the order of the predicate symbols arranged on the left hand side of $[\supset]$ is different for each rule, the predicate symbols may be rearranged so that they have the same order in all rules. In addition, all the predicate symbols arranged on the left hand side of each rule may be different for each rule. In this case, the expression is considered true when a unique constant, for example, [*] is applied with respect to all the predicate symbols. In addition, in the case where there is no predicate symbol [P] on the left hand side of $[\supset]$ of a certain rule $R_1$, and the predicate symbol [P] appears on the left hand side of $[\supset]$ of another rule $R_2$, it is possible to make the predicate symbols arranged on the left hand side of $[\supset]$ in all the rules by performing an operation to add [P(*)] to the left side of $R_1$.

FIG. 3 shows an example of a table for interpreting the group of rules shown in FIG. 2. The predicate symbols $[A_1], [A_2] \ldots, [A_n],$ and $[B]$ which appear in the rules in FIG. 2 correspond to the names of the columns in the table shown in FIG. 3. Columns are arranged in the order $[A_1], [A_2] \ldots, [A_n],$ and $[B]$. In addition, in the table in FIG. 3, the first row includes a cell which represents the fact that if the value of column $A_1$ is $a_{11}$, the value of column $A_2$ is $a_{12}$, and the value of column $A_n$ is $a_{1n}$ for example, then the value of column B become $b_1$. Thus each cell in the table represents the fact that the value of a variable corresponding to the name of a column is equal to a value stored in a cell. In addition, a cell located on the furthest right row corresponds to the right hand side of [⊃] of a rule, other cells correspond to the left hand side of [⊃] and cells corresponding to the left side of [⊃] are combined using [^].

Therefore, in FIG. 3, the first row in the table corresponds to the rule $[A_1 (a_{11})\char`\^ A_2(a_{12})\char`\^ \ldots \char`\^ A_n(a_{1n}) \supset B(b_1)]$. The same is true for other rows. It is possible to express a rule in an easily understandable form by using this table. In addition, because the arrangement of predicate symbols is the same in each rule, it is possible to express a group of rules using this type of table form.

In addition, by expanding an expression of a value stored in a cell and by storing an inequality sign and a variable in each cell, it is possible to express an inequality equation which shows the magnitude relationship between a value of a variable corresponding to a column and a value stored in a cell. For example, if [>1] is stored in a cell of the column $A_n$, it is possible for this cell to express an inequality equation $[A_n>1]$. Furthermore, for example, if [>1&<10] is stored in a cell, it is possible to express the inequality equations $[A_n>1]$ and $[A_n<10]$.

FIG. 4 shows a specific example of the table shown in FIG. 3. The table in FIG. 4 represents the necessity of a request for approval in an organization such as a company. That is, the table represents the relationship between request for approval type which represents the type of request for approval, the applicant's post, the amount of money which is the subject of the request of approval and necessity of the request of approval. For example, because cells which store variables such as [item purchase], [assistant], [*], and [necessary] are arranged in this order, the first row in the table in FIG. 4 represents the rule [if the type of request for approval is an item for purchase and the applicant's post is an assistant, a request for approval is necessary]. That is, the first row represents the rule [request_for_approval_type=item_purchase^post=assistant ⊃ request_for_approval_necessity=necessary]. Furthermore, if [*] is the unique value described above, and [amount_of-money=*] is considered true, then it is possible to interpret the fact that the first row expresses the rule [request_for_approval_type=item_purchase^post=assistant^amount_of_money=* ⊃ request_for_approval_necessity=necessary], which means the amount of money is not cared for. In addition, the second row of the table in FIG. 4 represents the rule [request_for_approval_type=item_purchase^post=manager^amount_of_money≤1000 dollars ⊃ request_for_approval_necessity=unnecessary]. Therefore, each row expresses a rule whereby there are three variables [request_for_approval_type], [post] and [amount of money] on the left hand side and the variable on the right hand side is [request_for_approval_necessity], and it is possible to make variables which appear between rules the same.

Figure 5:
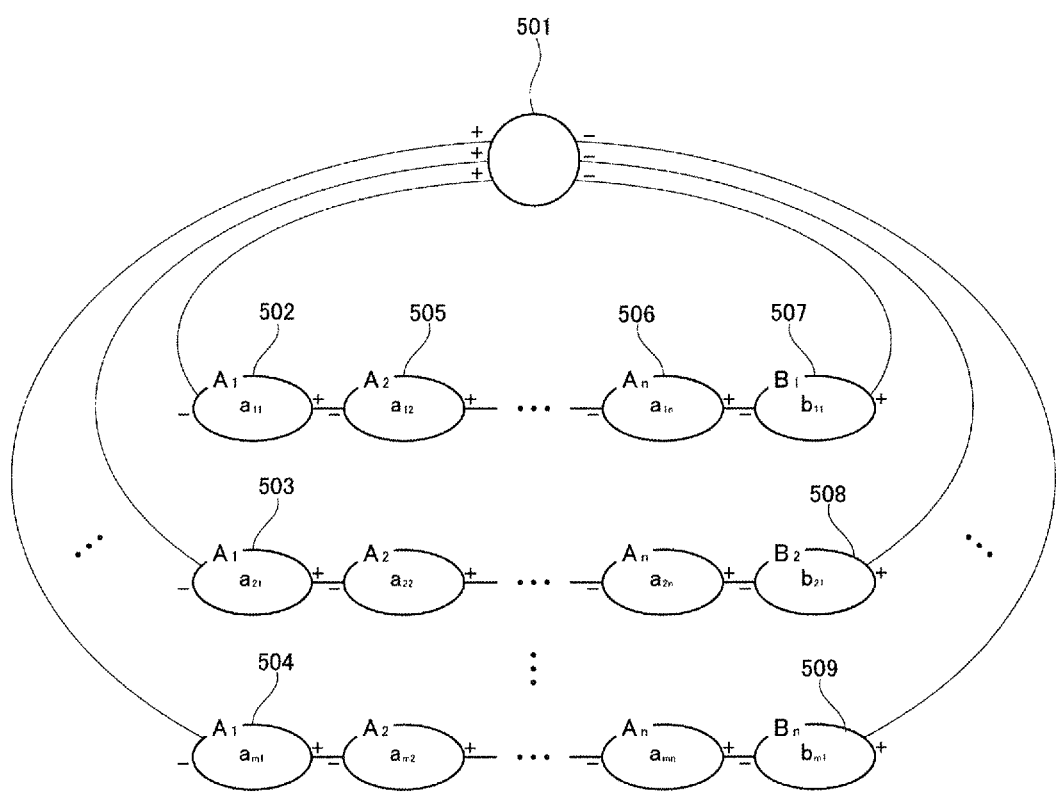
FIG. 5 is an exemplary diagram of a structure of data stored in a rule base of an inference device related to one embodiment of the present invention.

Furthermore, it is possible to make management of a table easier using spreadsheet software. As a result, it is possible to easily create rules by creating tables using spreadsheet software. In addition, data expressed using XML (eXtensible Mark-up Language) is stored in one part of the spreadsheet software when storing data which represents a table. In the case of expressing data which represents this type of table using XML, the table data can also be processed using wide ranging software in addition to spreadsheet software. Therefore, it is possible to create a group of rules using spreadsheet software and convert the created rules to an expression using XML. The expressions which are converted using XML are read by the inference device 101 for example, and it is possible to generate a data structure to be stored in a rule base. In addition, by processing expressions using XML, a data structure to be stored in a rule base may be generated after a process for merging cells and rearranging columns as explained below FIG. 5 is an exemplary diagram which shows a data structure which represents rules shown in FIG. 2. Therefore, the exemplary diagram shown in FIG. 5 shows a data structure corresponding to the table shown in FIG. 3. Furthermore, rules are stored in rule base 110 by storing this type of data structure in a memory, etc. The data structure represented in the exemplary diagram shown in FIG. 5 is stored in the rule base 110.

A data structure which represents rules includes a root node 501. The root node 501 commonly exists with all the rules. In addition, the root node 501 is connected to a node which expresses a logical expression on the furthest left end of the left hand side of [⊃] of each rule by an edge. In addition, the root node 501 is connected to a node which expresses a logical expression on the right hand side of [⊃] of each rule.

Each rule can be represented by a data structure which connects in series a node which expresses a logical expression on the left side of [⊃] and a node which expresses a logical expression on the right hand side of [⊃] by an edge. In addition, the order of nodes corresponds to the arrangement order of columns in table 3 for example. Nodes on both hand sides directly connected in this way are connected to the root node 501. For example, among the rules shown in FIG. 2, $[A_1(a_{11})\char`\^ A_2(a_{12})\char`\^ \ldots \char`\^ An(a_{1n}) \supset B(b1)]$ can be expressed by a data structure in which the node 502 which expresses $[A_1(a_{11})]$, node 505 which expresses $[A_2(a_{12})]$, node 506 which expresses $[An(a_{1n})]$ and node 507 which expresses $[B(b1)]$ are connected in series by edges. The same is also true for other rules.

In addition, the nodes 502, 503, . . . , 504 which express a logical expression located furthest left of [⊃] of each rule are connected to the root node 501 by an edge, and the nodes 507, 508, 509 which express a logical expression on the right hand side of [⊃] are connected to the root node 501 by an edge.

That is, a data structure which is stored in the rule base 110 becomes a graph data structure in which nodes which represent a logical expression arranged in each rule respectively are connected in series, a column of a node corresponding to each cell is formed, and a node on each end of each column is connected to the root node. In addition, nodes on both sides of one edge are sometimes described as being directly connected.

Furthermore, in the present embodiment, it is possible to consider that an edge which connects nodes includes a direction. That is, it is possible to consider that a digraph is formed by a node and an edge. One reason why an edge contains a direction is that if a logical expression on the left hand side of [⊃] is true, it is corresponded to the directionality of [⊃], which says that a logical expression on the right hand side is true. Thus, in FIG. 5, the symbol [+] is used to represent the start point of an edge, and the symbol [−] is used to represent an end point of edge. In this way, for example, which one of the nodes 502, 505, . . . 506, and 507 is a node which expresses a logical expression on the right hand side of [⊃], and therefore it is possible to judge which node is the node which expresses a logical expression on the left hand side of [⊃]. That is, a node on a start point of an edge which marks the end point of the root node is a node which expresses a logical expression on the right side of [⊃], and all other nodes (except the root node) are nodes which express logical expressions on the left hand side of [⊃].

In the present embodiment, there is one edge which marks the end point of an arbitrary node which expresses a logical expression on the left hand side of [ ⊃ ] of each rule. Due to this property, it is possible to effectively perform backwards inference for obtaining an expected conclusion in one embodiment of the present invention. In addition, because the order of predicate symbols which are arranged in the same order is the same in all the rules, a predicate symbol of a logical expression which is expressed by a node with the same distance from a root node is the same. In this way, it is possible to express a group of rules as a table. Here, the distance from a certain node to another node refers to the number of edges between the certain node and another node. For example, the distance from the root node 501 to the node 502 is 1 and the distance from the root node 501 to the node 505 is 2.

In addition, the following may be prepared instead of preparing one root node 501. That is, a first node which is connected to a node which expresses a logical expression on the furthest left among the left hand sides of [ ⊃ ] and a second node which is connected to a node which expresses the logical expression on the right hand side of [ ⊃ ] may be prepared. That is, a first node which is directly connected to a node on the left end of each rule and a second node which is directly connected to a node on the right hand side of each rule may be prepared. Although the case where one node is prepared is explained below, it is easy to consider the case where a first node and a second node are prepared.

FIG. 6 (*a*) is an exemplary diagram of a data structure which represents an edge which marks the start point of the end point of the root node 501 in the data structure shown in FIG. 5. In FIG. 6 (*a*), data which shows a node at the end point of an edge in which the start point is the root node 501 is stored on the right side of [+] and data which shows a node at the start point of an edge in which the end point is the root node 501 is stored on the right side of [−]. It is possible to use a pointer which marks an address at which a data structure corresponding to a node for example is stored as the data which shows a node. Data equivalent to the exemplary diagram shown in FIG. 6 (*a*) is stored in a memory space of a storage device in the rule base 110.

FIG. 6 (*b*) is an exemplary diagram of a data structure which represents an edge which marks a start point or end point of a node which expresses a logical expression [$A_i(a_{jk})$] in the data structure shown in FIG. 5. In FIG. 6 (*b*), data which shows a node at the end point of an edge in which the start point is a node which expresses the logical expression [$A_i(a_{jk})$] is stored on the right side of [+] and data which shows a node at the start point of an edge in which the end point is a node which expresses [$A_i(a_{jk})$] is stored on the right side of [−].

The next node acquisition part 111 acquires another node connected to a specified node via an edge from the rule base 110 in the case where a nod is specified. In the present embodiment, because an edge includes a direction, the next node acquisition part 111 includes two modes. In one mode a node which becomes the end point of an edge in which the start point is a specified node is obtained, and in the other mode, a node which becomes the start point of an edge in which the end point is a specified node is obtained. Furthermore, a node is specified by an address stored in the rule base 110 for example.

Furthermore, there is a plurality of nodes connected by the root node and an edge in the case where a specified node is the root node. As a result, the next node acquisition part 111 sometimes obtains a plurality of nodes. Therefore, in the case where a specified node is the root node 501 and the mode is a mode in which a node is obtained which is the start point of an edge in which the end point is a specified node, the next node acquisition part 111 obtains the nodes 502, 503, ..., 504.

Figure 7:
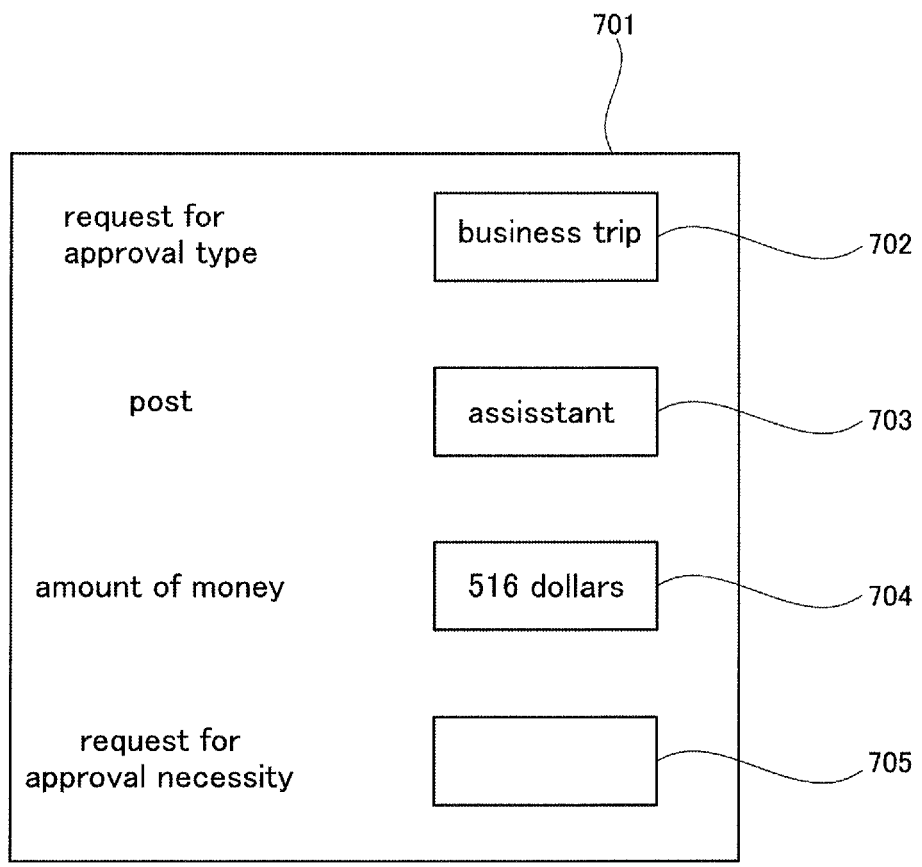
FIG. 7 is an example of a display of an inference device related to one embodiment of the present invention.

The data acquisition part 113 obtains data input using the input device 102 from the input device 102. FIG. 7 shows an example of an input screen of data displayed on a display which includes the input device 102. In FIG. 7, a window 701 is displayed on a display and input areas 702, 703, 704 such as text areas are displayed in the window 701. Character strings of "request for approval type", "post", "amount of money" and "request for approval necessity" are displayed on the left side of each input area. In this way, for example, the fact that a value corresponding to a constant of the request for approval type is input is displayed in the text area 702. In FIG. 7, "business trip" is input as the value of the request for approval, "assistant" is input as the value of the post and "516 dollars" is input as the value of the amount of money. The value of the request for approval necessity is not input. This refers to the fact that a request is made to the inference device 101 to judge the request for approval necessity from the values of the request for approval type, post and amount of money. That is, in the case a forward inference is performed.

Furthermore, a value selected using a pull down menu may be input instead of inputting text using a text area.

In one embodiment of the present invention, generally a forward inference is performed in the case when a value with regards to the right hand side of [ ⊃ ] is not input. In addition, a backwards inference is performed in the case when a value with regards to the right hand side of [ ⊃ ] is input.

After the data acquisition part 113 obtains data which represents a value input using the input device 102 from the input device 102, the data is stored in a storage device such as a memory in the inference device 101. For example, a constant symbol which represents "business trip" is stored in a specified address corresponding to the request for approval type.

The true-false judgment part 112 judges whether a logical expression corresponding to a specified node is true or false in the case where a node is specified. When a judgment is made whether a logical expression is true or false, data stored in a storage device such as a memory in the inference device 101 is referenced by the data acquisition part 113. For example, in the case where a specified node corresponds to [request_for_approval_type="business trip"], if data which represents "business trip" is stored at the memory address corresponding to the request for approval type in the storage device such as a memory of the inference device 101, a true judgment is made, and if data which represents "item purchase" is stored at this memory address, a false judgment is made. In addition, if data is not stored at a memory address corresponding to a request for approval in a storage device such as a memory in the inference device 101, a judgment may be made that a true or false judgment cannot be made and is therefore indefinite.

The inference part 114 makes an inference by referring to (1) data stored in a storage device such as a memory in the inference device by the data acquisition part 113, and (2) data structure which represents rules stored in the rule base 110. In addition, the result of the inference is output to the output device 103. For example, in the case where the input shown in FIG. 7 is performed, the inference part 113 infers that [request_for_approval_necessity=necessary]. Thus, a result for displaying a value which shows that the request for approval is necessary in the text area 705 is sent to the output device 103.

(Forward Inference)

Figure 8:
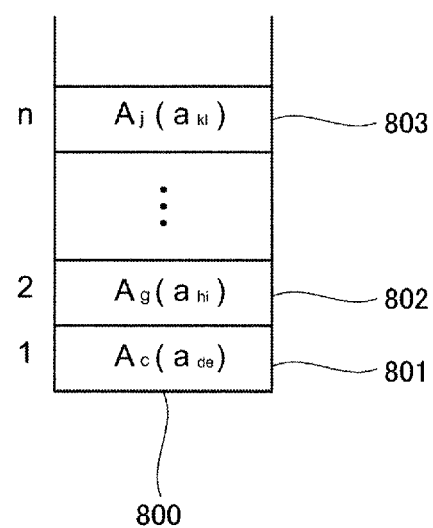
FIG. 8 is an exemplary diagram of a stack used in an inference device related to one embodiment of the present invention.

An example of the processes when the inference part 114 performs an inference is explained below. Here, inference which leads to a conclusion from given conditions, in other words a forward inference is explained. In the explanation below and example of a process for performing an inference by what is called a depth first search using a stack is given. A stack is a structure whereby a node (or data which represents a node such as a pointer to a node) is stored in a mode of last-in-first-out. An example of a stack is shown in FIG. 8. In FIG. 8, there are three slots, first slot 801, second slot 802, and third slot 803 in order from the bottom of the stack 800. Data (a node address for example) of a node which expresses the logical expression $[A_c(a_{de})]$, $[A_g(a_{ki})]$, $[A_j(a_{lm})]$ is stored in each of the slots 801, 802, and 803. In this state, when data of a node is newly input to the stack, the data is stored in n+1$^{st}$ slot. That is, a slot at the top of the stack is prepared and data of a node is stored in the uppermost slot. In this way, preparing a slot at the top of the stack refers to newly inputting data of a node to the stack, or packing a node to the stack or pushing a node.

In addition, when data which represents a node is extracted from the stack in the state shown in FIG. 8, data of a node which expresses $[A_j(a_{ki})]$ which is the node stored in the uppermost slot 803 is obtained. In addition, the next uppermost slot becomes the slot directly below the slot 803. Thus, extracting data of a node from a stack in the way is called popping a stack. In addition, when a stack is popped in a state in which data of a node is stored only in the lowest slot 801 in the stack, the stack becomes empty.

Figure 9:
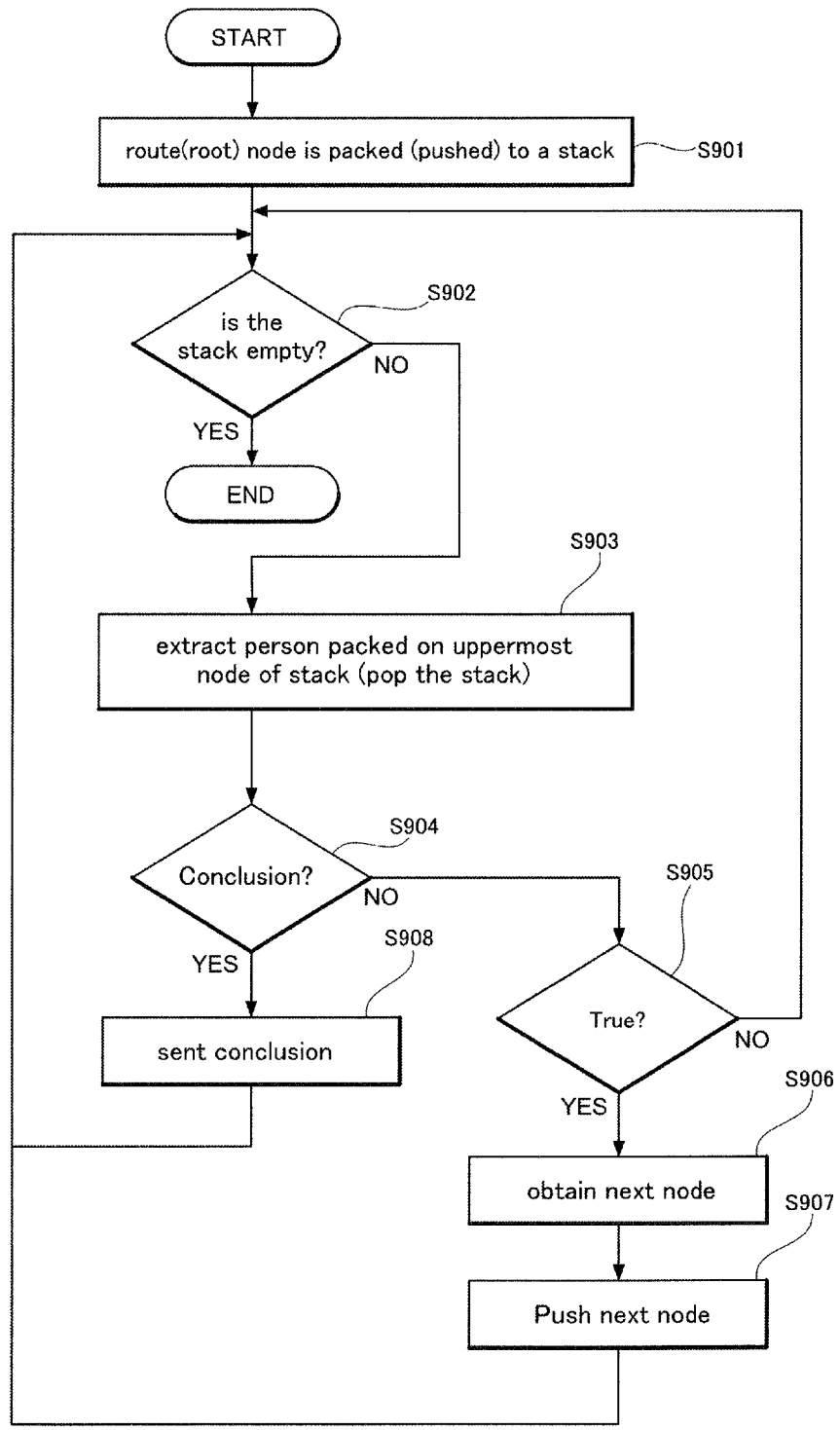
FIG. 9 is a flowchart of the process of forward inference in an inference device related to one embodiment of the present invention.

FIG. 9 shows a flow chart for explaining the processes when the inference part 114 performs forward inference. The stack is in an empty state before the processes in this flow chart are performed. In addition, the next node acquisition part 111 is in a mode which obtains a node which becomes the start point of edge in which the end point is a specified node.

The processes in the flow chart shown in FIG. 9 are performed for example, when the data acquisition part 113 obtains data which represents an instruction to perform an inference from the input device 102. It is possible to judge whether a forward inference is performed or not by whether a true or false value of a logical expression on the right hand side of [ ⊃ ] is indefinite or not. For example, in FIG. 7, in the case where a value in not input to the text area 705, because a true or false value is indefinite for both [request_for_approval_necessity=necessary] and [request_for_approval=unnecessary], a forward inference is performed.

The root node is pushed in the process of step S901. In this way, the root node is stored in the uppermost slot of the stack.

A judgment is made whether the stack is empty or not in the process of step S902. Inference is completed if the stack is empty. Thus, data which shows inference completion is sent to the output device 103 and the result of the inference is sent to the output device 103.

If the stack is not empty in the process of step S902, the process shifts to step S903 and the stack is popped. In this way data of a node is obtained.

A judgment is made whether the node of data obtained in step S903 is the node which expresses a logical expression on the right hand side of [ ⊃ ] in the process of step S904. It is possible to judge whether the node is the node which expresses a logical expression on the right hand side of [ ⊃ ] by for example whether it is the root node which is the end point of an edge in which the start point is this node, Furthermore, a node which represents a logical expression on the right side of [ ⊃ ] is sometimes called a "conclusion node" below.

In step S904, when a judgment is made that the node obtained in step S903 is not the conclusion node, the process shifts to step S905. In the process in step S905, a judgment is made by the true or false judgment part 112 whether a true or false value of a logical expression represented by the node obtained in step S903 is true or false. If the result of the true or false judgment by the true or false judgment part 112 is true, the process shifts to step S906, and returns to step S902 if the result is false.

Furthermore, in the case where the result of a judgment of a true or false variable by the true or false judgment part 112 is indefinite, a logical expression etc. represented by the node obtained in step S903 may be output to the output device 103. For example, in the case where the result of a judgment as to whether [post="manager"] is true or false is indefinite, [post="manager"] may be sent to the output device 103. In this way, the output device 103 can display [are your post manager?] or [please input your post]. Thus, it is possible that there is an item not input by a user in the input device 102 or it is possible to encourage a user to input an item which has not been input. As a result of encouraging an input, in the case where data is obtained by the data acquisition device 113 from the input device 102, a true or false judgment is made again of the node obtained in step S903 and it is possible to shift the process to step S906 or step S902 depending on true or false.

In addition, in the case where the result of a true or false value judgment of a logical expression represented by the node obtained in step S903 is false in step S905, the logical expression represented by the node obtained in step S903 is stored in advance and the process may shift to step S906 and not step S902. Following this, in the case where the process shifts to step S908, the stored logical expression is output to the output device 103 and when it is assumed that the logical expression which was false is actually true, the output device 103 may output what type of conclusion is obtained.

In the process in step S906, the next node after the node obtained in step S903 is obtained by the next node acquisition part 111. In addition, in the process in step S907, the node obtained by the process in step S906 is pushed and the process returns to step S902. If a plurality of nodes is obtained by the next node acquisition part 111, the plurality of nodes are pushed.

In addition, in the process in step S904, when it is judged that the node obtained in step S903 is a conclusion node, the process shifts to step S908. The result of conclusion is obtained in the process in step S908. Obtaining a result of a conclusion means that a logical expression represented by a conclusion node is obtained. In addition, a value included in the obtained logical expression may also be obtained. For example, a value which represents [necessary] may be obtained in the case where the logical expression [request_for_approval_necessity=necessary]. The obtained value may also be output to the output device 103. In the case where data which represents the logical expression [request_for_approval_necessity=necessary] is sent to the output device 103, [=] is replaced with the character string "as a result of judging . . . ", a different routine character string "becomes" is added and a message such as "becomes necessary as a result of judging a request for approval necessity" may be displayed.

A process for performing an inference using a depth first search is explained using FIG. 9. It is also possible to perform an inference using a breadth first search. In this case, an operation area corresponding to each node is prepared in a memory, nodes which express a logical expression on the left hand side of [ ⊃ ] of each rule are scanned in order, and whether there is a logical expression judged to be false by the true or false judgment part 112 in a rule which corresponds to that operation area is stored in each operation area. If the fact that there is a logical expression judged to be false is stored in an operation area, scanning of a rule which corresponds to that operation area is terminated, and in the case where a conclusion node is reached, data related to that node is sent to the output device 103. In the present embodiment, because a predicate symbol of a logical expression expressed by a node located at the same distance from a root node is the same, it is possible to perform a true or false judgment for a plurality of nodes. For example, in FIG. 5, with respect to the predicate symbol $A_I$, it is possible to perform a true of false judgment for $A_I(a_{II})$, $A_I(a_{zI})$, ..., $A_I(a_{mI})$ at the same time. Next, a true or false judgment for the predicate symbol $A_2$ of a rule which includes a node which represents a logical expression judged not to be false among $A_I(a_{II})$, $A_I(a_{zI})$, ..., $A_I(a_{mI})$ is performed at the same time.

A method for reducing the number of nodes stored in a rule base and a data structure for effectively performing an inference are explained below.

(Merging of Cells or Nodes)

As is shown in FIG. 3 and FIG. 4, when a data structure is formed by corresponding a cell on each row of a table formed by a number of cells, the number of which is a value obtained by a product of the number of columns and the number of rows, with one rule and storing in a rule base, a number of nodes obtained by the product of the number of columns and the number of rows, and the root node are obtained. However, generally, the number of different values stored in a cell of a table is sometimes smaller than the number of the product of the number of columns and the number of rows. For example, although the table shown in FIG. 4 is comprised of 4 columns and 10 rows, the number of different values stored in a cell is 16, that is, "item purchase", "business trip", "general", "assistant", "manager", "*", "1000 dollars or less", "more than 1000 dollars", "100 dollars or less", "more than 100 dollars", "500 dollars or less", "more than 500 dollars", "700 dollars or less", "more than 700 dollars", "necessary", and "unnecessary".

In particular, in the table shown in FIG. 4, the number of different values stored in cells of the column request for approval which is the column on the furthest left is 3 which is less than the number of rows which is 10. As a result, in the case where each row of the table shown in FIG. 4 is corresponded with one rule and a data structure stored in a rule base is formed as is shown in FIG. 5, a node exists which expresses the same logical expression among the nods 502, 503, ..., 504 which are located at the same distance from the root node 501. Consequently, in step S906 in FIG. 9, a plurality of nodes which express the same logical expression is obtained and a judgment of a true or false value of the same logical expression is performed in step S905.

Thus, all of the rows of the table may be sorted (rearranged) according to the number of columns, and the cells having the same values from the left column may be merged. For example, in the table shown in FIG. 4, all the rows in the table are sorted (rearranged) according to the values of each column and the value of the request for approval column from the first row to the third row which is "item purchase" becomes the same. Thus, it is possible to merge or integrate into one cell the request for approval column cells from the first row to the third row. Next, looking at the values of the post column from the first row to the third row, the first row is "assistant" and the second and third rows are "manager" and therefore it is possible to merge the cells of the second and third rows. A result of merging other rows as described above is shown in FIG. 10. As is shown in FIG. 10, when a merge process of cells is performed, the number of cells on the right of an arbitrary cell becomes 1 or 2 or more.

The following procedure is performed when generating a data structure which is stored in a rule base using a table produced by merging cells in the way. First, while scanning the columns from left to right and nodes are generated corresponding to each cell in that column in each column. Next, with regards to each node, a node corresponding to a cell on the right side of a cell corresponding to a node is connected by an edge. Lastly, the root node and a node corresponding to a cell on the furthest left column and a node corresponding to a cell on the furthest left column are connected to the root node by edges. Furthermore, with regards to the furthest right column, a node corresponding to a different values stored in a column is generated. A node corresponding to a cell on the furthest right column is a node corresponding to the value of that cell.

Figure 11:
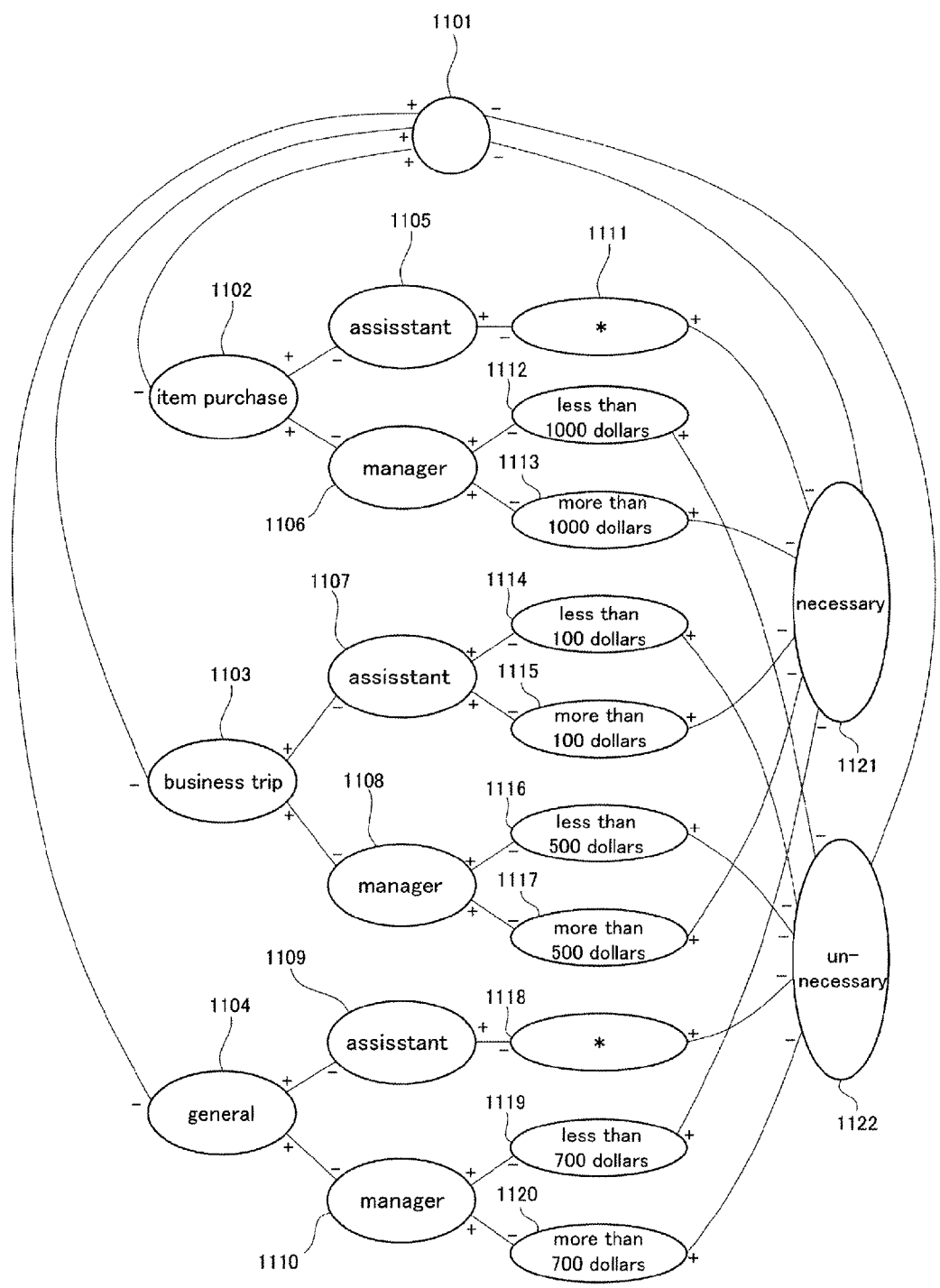
FIG. 11 is an exemplary diagram of a structure of data stored in a rule base of an inference device related to one embodiment of the present invention.

FIG. 11 shows a data structure generated from the table shown in FIG. 10 using the procedure described above. Node 1102 corresponds to a cell in which "item purchase" of the request for approval column is stored. Node 1105 corresponds to a cell in which "assistant" on the right of a cell which corresponds to the node 1102, and the node 1106 corresponds to a cell in which "manager" on the right of a cell corresponding to the node 1102 is stored. The node 1111 corresponds to a cell in which "*" on the right side of a cell corresponding to the node 1105 is stored, node 1112 corresponds to a cell in which "1000 dollars or less" on the right of a cell corresponding to the node 1106 is stored, and node 1113 corresponds to a cell in which "more than 1000 dollars" on the right side of a cell corresponding to the node 1106 is stored. It is possible to make the same explanation with regards to other cells 1103-1120.

In addition, the node 1121 is the node which corresponds to the cell "necessary" stored in the request for approval necessity column, and node 1122 is the node which corresponds to the cell "unnecessary" stored in the request for approval necessity column. Therefore, if the same logical expression exists among the logical expression arranged on the right hand side of each of a plurality of rules, a rule may be merged in the graph data structure stored in the rule base 110.

The procedure for generating a data structure from a table in which cells have been merged was described above. However, it is possible generate a data structure from a table before merging cells and obtain the same data structure by merging cells from a root node. When this procedure is named Merge (root node), merge (N) means that (1) if a node of an end point of an edge of which N is the start point is a root node, nodes corresponding to the same logical expression are merged with regards to a node of a start point of a node o which the end point is the root node and the procedure is complete, and (2) with regards to a node of an end point of an edge of which N is the start point, nodes corresponding to the same logical expression are merged and Merge (M) is performed with regards to each node that is obtained by merging.

Furthermore, even when cells or nodes are merged, predicate symbols of a logical expression expressed by nodes the same distance from the root node are the same. In addition, there is one edge the end point of which is an arbitrary node which expresses a logical expression on the left hand side of [ ⊃ ] of each rule.

(Rearranging Columns of a Table)

The columns of a table may be rearranged before merging cells or nodes. FIG. 12 shows a table obtained by exchanging the columns of the table shown in FIG. 4 and merging the cells. That is, among the columns of the table shown in FIG. 10, the table is obtained by performing the procedure for rearranging columns so that the furthest left column is "post" and the next column on the right is "request for approval type". Performing this type of column rearrangement is a result of prioritizing the post column with fewer variables than the request for approval column type column because there are three different values stored in the request for approval type column "item purchase", "business trip" and "general" and there are two different values stored in the post column, "assistant" and "manager". In addition, because the number of different values stored in the amount of money column is nine, the post and request for approval type columns are prioritized rather than the amount of money column. Furthermore, the request for approval necessity is the furthest right column and is not rearranged since it is a column corresponding to a conclusion.

That is, rearranging the columns of a table means that the number of different variables stored in each column is calculated columns with fewer variables are prioritized and positioned on the left. In the case where the predicate symbols arranged in a plurality of rules are given column names arranged in order from left to right, each row is corresponded with each rule and a table is created in which constants included in a logical expression arranged in each rule of a corresponding column are arranged, except the column arranged on the furthest right, it is possible to say that the number of types of variable stored in each column is the same or less than the number of types of variables in the column to the right.

Figure 13:
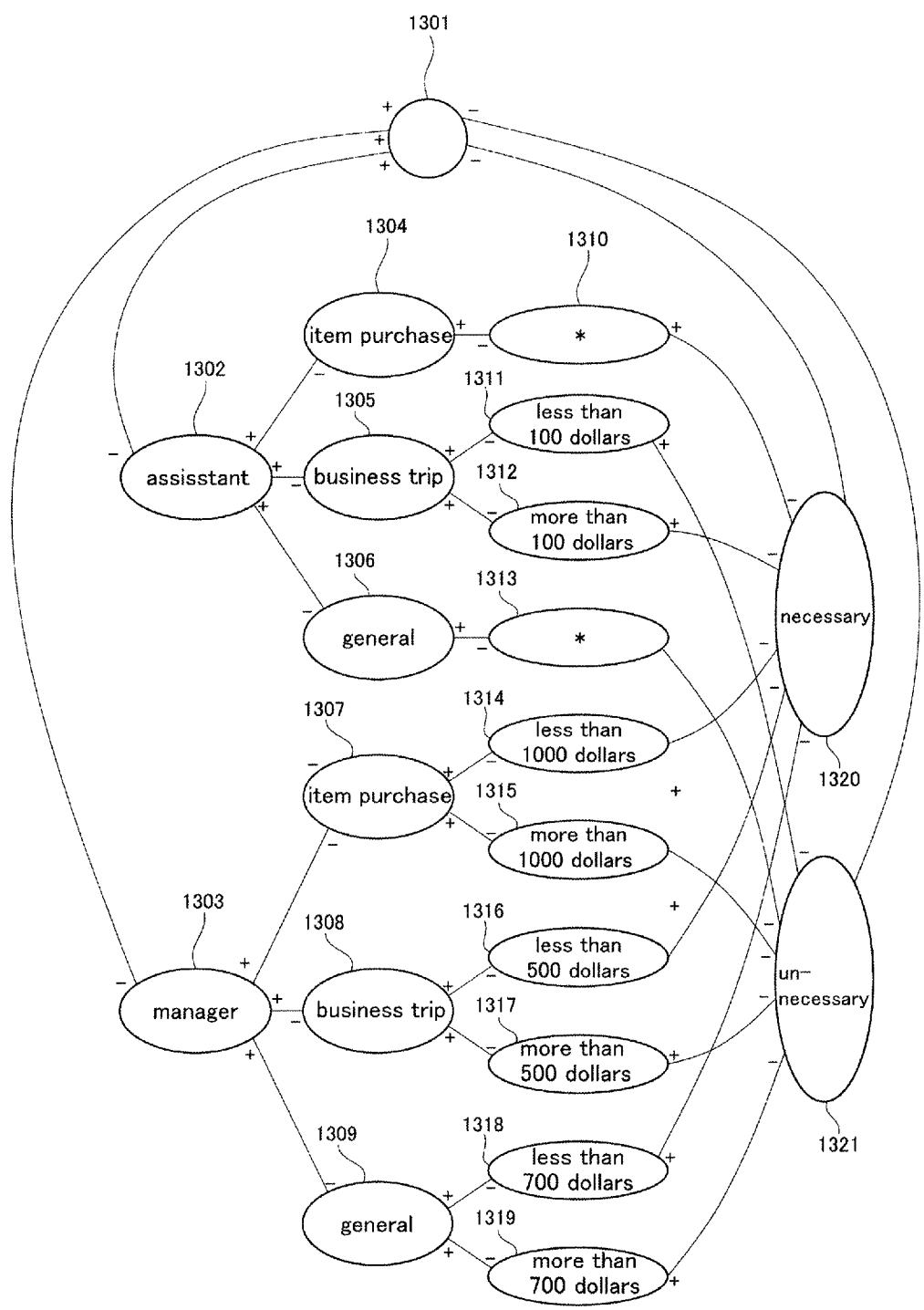
FIG. 13 is an exemplary diagram of a structure of data stored in a rule base of an inference device related to one embodiment of the present invention.

FIG. 13 shows a data structure generated from the table shown in FIG. 12. This data structure is formed from 21 nodes as is shown by the reference symbols 1301~1321. However, from FIG. 10 in which columns are not rearranged, a data structure is obtained formed from 22 nodes shown from 1101 to 1122 as shown in FIG. 11, and it is possible to reduce the number of nodes by rearranging the columns of the table.

(Backwards Inference)

An inference which obtains conditions for obtaining an expected conclusion, that is a backwards inference, is explained below.

Figure 14:
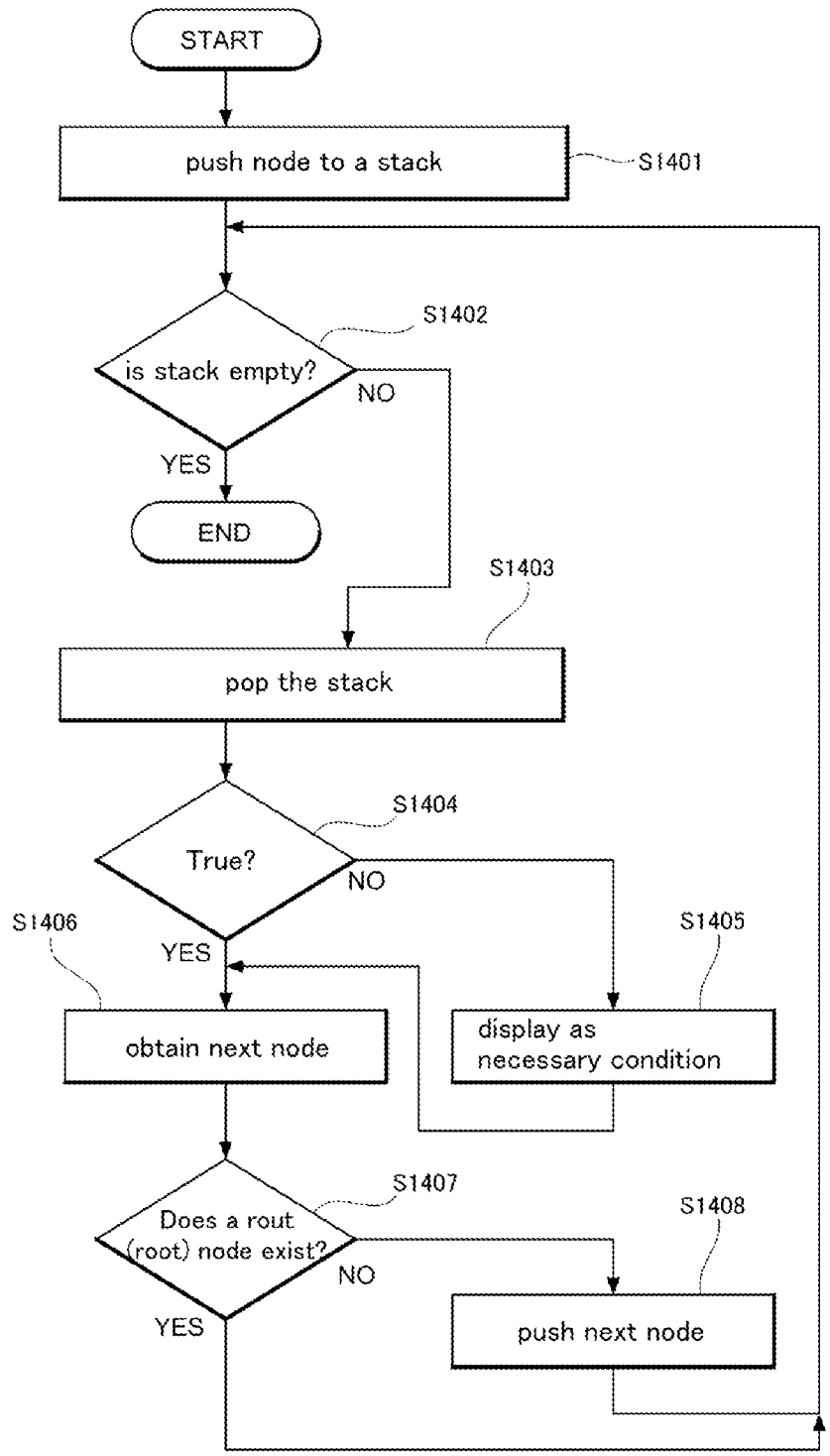
FIG. 14 is a flowchart of the process of backward inference in an inference device related to one embodiment of the present invention.

FIG. 14 shows a flow chart for explaining a process when the inference part 113 performs a backwards inference. Before the processes in the flow chart are performed the stack is assumed to be in an empty state. The processes of the flow chart, for example, are performed when data which represents an instruction for executing inference is obtained by the data acquisition part 113 from the input device 102. In addition, it is possible to judge whether forward inference or backwards inference should be performed by whether a true or false value of a logical expression on the right hand side of [ ⊃ ] is indefinite or not. For example, in FIG. 7, in the case where "necessary" is input as a value to the text area 705, because a true or false value of both [request_for_approval_necessity=necessary] and [request_for_approval+necessity=unnecessary] is no longer indefinite it is possible to perform a backwards inference.

The root node is pushed to a stack in the processes in step S1401. In this way, the root node is stored in the uppermost slot of the stack.

A judgment is made whether the stack is empty or not in the processes in step S1402. If the stack is empty the inference is complete. Thus, notice that the inference is completed is sent to the output device 103 and the result of the inference is sent to the output device 103.

In the processes in step S1402, if the stack is not empty the process shifts to step S1403 and the stack is pushed and thereby a node is obtained.

In step S1404, a judgment is made by the true or false judgment part 112 whether a logical expression represented by a node obtained in step S1403 is true or not. If the true or false judgment part 112 makes a true judgment, the process shifts to step S1403. If the judgment is false the process shifts to step S1405, and the fact that the logical expression represented by the node obtained in step S1403 is true is displayed. For example, the fact that post must be assistant is displayed corresponding to the logical expression [post="assistant"]. Furthermore, if a judgment made by the true or false judgment part 112 is false, the process shifts to step S1402 without performing any procedure and the process in step S1405 may be performed in the case where a judgment made by the true or false judgment part S1402 is indefinite.

If a judgment made by the true or false judgment part 112 is false, a logical expression represented by a node obtained in step S1403 is stored, the logical expression stored when the stack is judged to be empty in step S1402 is output to the output device 103 and if a logical expression judged to be false is true the output device may display the fact that an expected conclusion is obtained.

In the process in step S1406, the next node after the node obtained in step S1403 is obtained by the next node acquisition part 111. In addition, in the process in step S1407, a judgment is made whether the root node exists within the node obtained by the process in step S1407. If the root node exists within the node obtained by the process in step S1407 the process returns to step S1402.

If by the judgment in step S1407 the root node does not exist within the node obtained by the process in step S1407, the node obtained by the process in step S1407 is pushed to the stack.

Furthermore, in step S1405, a logical expression may be stored in a memory etc as a condition to be satisfied instead of being displayed as a necessary condition. In addition, in step S1407, in the case where the root node exists in a node obtained by the process in step S1407, the stored condition may be output to the output device 103 and displayed as the logical expression to be satisfied. In particular, in the case where the logical expression is an unequal equation, the optimum solution may be calculated by linear programming for example.

The process for performing an inference using depth first is explained so far using FIG. 14. However, inference may also be performed using breadth first.

The inference device relating to one embodiment of the present invention may be realized using a computer. For example, a graph data structure which represents a plurality of rules is stored in a memory or secondary storage device. Data received from an input device is stored in a storage area such as a memory. In addition, a backwards inference is performed if a judgment is made that a logical expression on the right side of any one of a plurality of rules is true, a node which represents a plurality of logical expressions of a logical sum arranged on the left side of a rule in which a logical expression judged to be true is arranged on the right side is scanned, and a logical expression which should be judged true in order to establish a rule in which a logical expression judged to be true is arranged on the right side is calculated. In addition, a forwards inference is performed if a true of false logical expression on the right hand side of a rule of the plurality of rules is judged to be indefinite, nodes connected in series are scanned and a true logical expression among logical expressions arranged on the right side of any one rule of the plurality of rules is calculated.

According to one embodiment of the present invention, it is possible to provide an inference device which can both lead to a conclusion from given or provided conditions and obtain conditions for obtaining an expected conclusion. In addition, in an expression of a rule in a rule base, it is possible to decrease a storage region required for the rule base and effectively perform inference by merging common nodes.

What is claimed is:

1. An inference device comprising:
a rule base including a graph data structure embodied in a non-transitory computer-readable storage medium, the graph data structure corresponding to a table formed from a plurality of columns arranged in a certain order, each of the plurality of columns corresponding to a predicate symbol, and one or more rows including a plurality of cells, each of the plurality of cells arranged in a position of one of the plurality of columns, each of the plurality of cells in the table storing a value for forming a logical expression by applying to each predicate symbol corresponding to a column where the cell is located, the graph data structure including a root node and a plurality of sequences of nodes, nodes in each of the plurality of sequences being connected in series by pointers in an order of the columns, each of the plurality of sequences of nodes corresponding to a row of the table and each node corresponding to a cell in a row of the table, a node at an end of each of the plurality of sequences of nodes is connected to the root node by a pointer, the plurality of node being configured to be scanned in order following the pointers from the root node, each row of the table representing a rule in which a plurality of logical expressions are arranged on the left hand side as a logical conjunction and a logical expression are arranged on the right hand side;
a processor, including
a data acquisition part configured to obtain data for judging whether a logical expression is true or false, the data being input to a plurality of input areas; and
an inference part configured to scan nodes which represents a plurality of logical expressions of a logical conjunction arranged on the left side of a rule when a logical expression on the right hand side of a rule is judged to be true using the data obtained by the data acquisition part and for calculating a logical expression which should be judged to be true for establishing the rule, where the logical expression judged to be true is arranged on the right hand side, and to scan nodes connected in series and for calculating a logical expression which is true among the logical expressions arranged on the right hand side of any one of the plurality of rules is calculated when logical expressions on the right hand sides of all of the rules are judged to be indefinite using the data obtained by the data acquisition part.

2. The inference device according to claim 1, wherein if values stored in cells arranged at a location of the same column in adjacent rows of the table are the same value, the cells storing the same value are merged.

3. The inference device according to claim 1, wherein in the case where predicate symbols of logical expressions arranged in a plurality of rules are given as column names arranged in order from left to right, and in the case where each row is corresponded with each rule and values included in a logical expression arranged in each rule of a corresponding column are arranged in the table, the number of same values stored in each column is the same or less than the number of same values in a column to the right, except the column arranged on the furthest right.

4. An inference method executed by a computer referring to a rule base including a graph data structure embodied in a non-transitory computer-readable storage medium, the graph data structure corresponding to a table formed from a plurality of columns arranged in a certain order, each of the plurality of columns corresponding to a predicate symbol, and one or more rows including a plurality of cells, each of the plurality of cells arranged in a position of one of the plurality of columns, each of the plurality of cells in the table storing a value for forming a logical expression by applying to each predicate symbol corresponding to a column where the cell is located, the graph data structure including a root node and a plurality of sequence of nodes, nodes in each of the sequences being connected in series by pointers in a sequence order of the columns, each of the plurality of sequences of nodes corresponding to a row of the table and each node corresponding to a cell in a row of the table, a node at an end of each of the plurality of sequences of nodes is connected to the root node by a pointer, the plurality of node being configured to be scanned in order following the pointers from the root node, each row of the table representing a rule in which a plurality of logical expressions are arranged on the left hand side as a logical conjunction and a logical expression is arranged on the right hand side;
the inference method comprising:
obtaining data for judging whether a logical expression is true or false and storing the data in a memory, the data being input to a plurality of input areas;
scanning a node which represents a plurality of logical expressions of a logical conjunction arranged on the left hand side of a rule when a logical expression on the right hand side of a rule is judged to be true using the data obtained by a data acquisition part and calculating a logical expression which should be judged to be true for establishing the rule in which the logical expression judged to be true is arranged on the right hand side; and
scanning nodes connected in series and calculating a logical expression which is true among the logical expressions arranged on the left hand side of any one of the plurality of rules is calculated when a logical expression on the right side of all of the rules is judged to be indefinite using the data obtained by the data acquisition part using the data obtained by the data acquisition part.

5. An inference device comprising:
a rule base storing a plurality of processor-executable rules in which a plurality of logical expressions are arranged on the left hand side as a logical conjunction and a logical expression is arranged on the right hand side using a graph data structure in which nodes representing logical expressions arranged in a sequence corresponding to a rule are connected in series and nodes on both ends of the sequence are connected to a root node with respect to each rule;
a processor, including
a data acquisition part configured to obtain data for judging whether a logical expression is true or false, the data being input to a plurality of input areas; and
an inference part configured to scan nodes which represents a plurality of logical expressions of a logical conjunction arranged on the left hand side of a rule when a logical expression on the right side of a rule is judged to be true using the data obtained by the data acquisition part and calculating a logical expression which should be judged to be true for establishing the rule in which the logical expression judged to be true is arranged on the right side is calculated, and to scan nodes connected in series and calculating a logical expression which is true among the logical expressions arranged on the left hand side of any one of the plurality of rules when logical expressions on the right sides of all of the rules is judged to be indefinite using the data obtained by the data acquisition part.

6. The inference device according to claim 5, wherein if the same logical expression exists among logical expressions arranged on the right side of each of the plurality of rules, nodes which represent the same logical expression are merged into one node in the graph data structure.

7. The inference device according to claim 5, wherein predicate symbols of logical expressions which are represented by nodes at an equal distance from the root node among nodes which represent a logical expression arranged on the left hand side of the plurality of rules are the same.

8. The inference device according to claim 7, wherein in the case where predicate symbols of logical expressions arranged in the plurality of rules are given as column names arranged in order from left to right, and in the case where each row is corresponded with each rule of a corresponding column are arranged in the table, the number of same values stored in each column is the same or less than the number of same values in a column to the right, except the column arranged on the furthest right.

9. The inference device according to claim 7, wherein if the same logical expression exists among logical expressions arranged on the right hand side of each of the plurality of rules, nodes which represent the same logical expression are merged into one node in the graph data structure.

10. An inference method executed by a computer referring to a rule base storing a plurality of processor-executable rules in which a plurality of logical expressions are arranged on the left hand side as a logical conjunction and a logical expressions is arranged on the right hand side using a graph data structure in which nodes representing a logical expression arranged in a sequence corresponding to a rule are connected in series and a node on an end of each sequence are connected to a root node with respect to each rule;

the method comprising:
obtaining data for judging whether the logical expression is true or false and storing the data in a memory, the data being input to a plurality of input areas;
scanning a node which represents a plurality of logical expressions of a logical conjunction arranged on the left hand side of a rule in which the logical expression judged to be true is arranged on the right hand side when a logical expression on the right hand side of a rule is judged to be true using the data obtained by a data acquisition part and calculating a logical expression which should be judged to be true for establishing the rule in which the logical expression judged to be true is arranged on the right hand side; and
scanning nodes connected in series and calculating a logical expression which is true among the logical expressions arranged on the left hand side of any one of the plurality of rules is calculated when logical expressions on the right hand side of all of the rules are judged to be indefinite using the data obtained by the data acquisition part using the data obtained by the data acquisition part.

11. A rule base including a graph data structure embodied in a non-transitory computer-readable storage medium, the graph data structure corresponding to a table formed containing a plurality of columns, each column corresponding to a predicate symbol, being arranged in a certain sequence, and a plurality of rows including cells, each of cells being arranged in a position of any one of the plurality of columns, the table storing a value for forming a logical expression by applying to each predicate symbol corresponding to a column where the cell is located, the rule base comprising:
a root node stored in a memory space; and
sequences of a plurality of nodes stored in the memory space, each of the plurality of nodes corresponding to a cell in each row of the table, the plurality of nodes being connected in series using pointers in an order of the columns in the memory space;
wherein
a node at an end of each sequence of the plurality of nodes is connected to the root node by pointers, nodes in each sequence being configured to be scanned in order following the pointer from the root node.

12. The rule base according to claim 11, wherein if values stored in cells arranged at a location of the same column in adjacent rows of the table are the same values, the cells storing the same values are merged.

13. The rule base according to claim 12, wherein a column is located towards the beginning of the order the fewer the number of same variables stored in cells at a location of the column.

14. The rule base according to claim 11, wherein a column is located towards the beginning of the order the fewer the number of same variables stored in cells at a location of the column.

* * * * *